United States Patent [19]

Esmond

[11] 4,349,440
[45] Sep. 14, 1982

[54] CAPILLARY TUBE EXCHANGE DEVICE

[76] Inventor: William G. Esmond, 800 Country Club Rd., Havre de Grace, Md. 21078

[21] Appl. No.: 853,504

[22] Filed: Nov. 21, 1977

[51] Int. Cl.³ .......................................... B01D 13/00
[52] U.S. Cl. .............................. 210/321.1; 165/175; 55/158; 210/541
[58] Field of Search ............... 210/321.1, 321.2, 321.3, 210/433.2, 323 T, 541; 165/173–175, 176, 178; 55/158

[56] References Cited

U.S. PATENT DOCUMENTS

| | | | |
|---|---|---|---|
| 1,986,570 | 1/1935 | Ganz | 210/323 T |
| 2,295,087 | 9/1942 | Kleucker | 165/176 X |
| 2,674,440 | 4/1954 | Donovan | 210/321 A |
| 3,558,481 | 1/1971 | Furgerson | 210/321 A |
| 3,704,223 | 11/1972 | Dietzsch et al. | 210/321 B |
| 4,031,012 | 6/1977 | Gics | 210/321 B |
| 4,038,191 | 7/1977 | Davis et al. | 210/321 B |
| 4,051,041 | 9/1977 | Riede | 210/321 B |
| 4,071,453 | 1/1978 | Koslowski | 210/433 M |
| 4,133,764 | 1/1979 | Bardin | 210/321 B |

Primary Examiner—John Adee
Attorney, Agent, or Firm—Charles E. Brown

[57] ABSTRACT

A exchange device which may be utilized as an artificial kidney wherein a group of capillary tubes have opposite end portions bonded together in sealed relation by a rib and the rib has formed in cooperating relation therewith a header. The exchange device may have one pair of continuous headers arranged in spiral relation, or there may be plural pairs of headers connected to manifolds. The headers and tubes are disposed within a housing and a treating fluid is circulated in the housing around the tubes.

10 Claims, 8 Drawing Figures

U.S. Patent   Sep. 14, 1982   Sheet 1 of 2   4,349,440
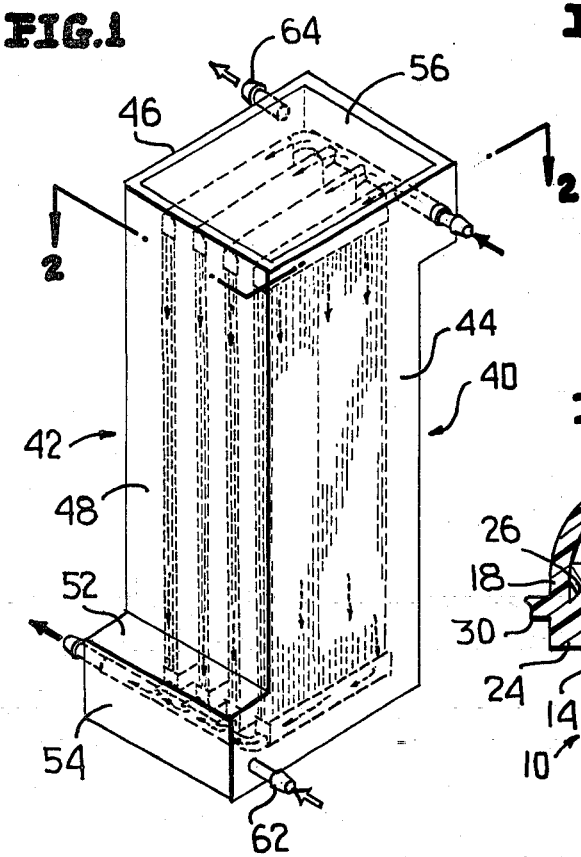
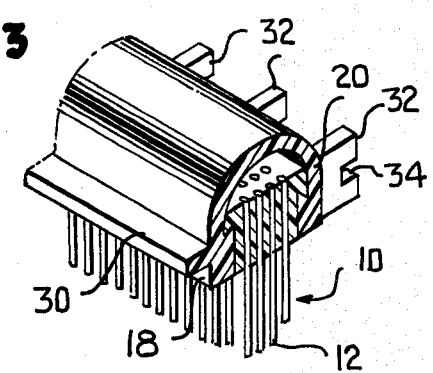
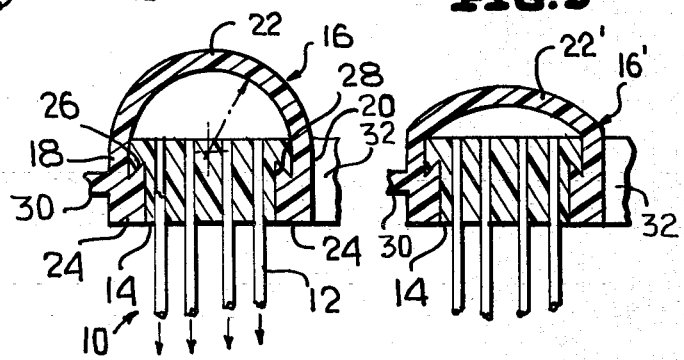
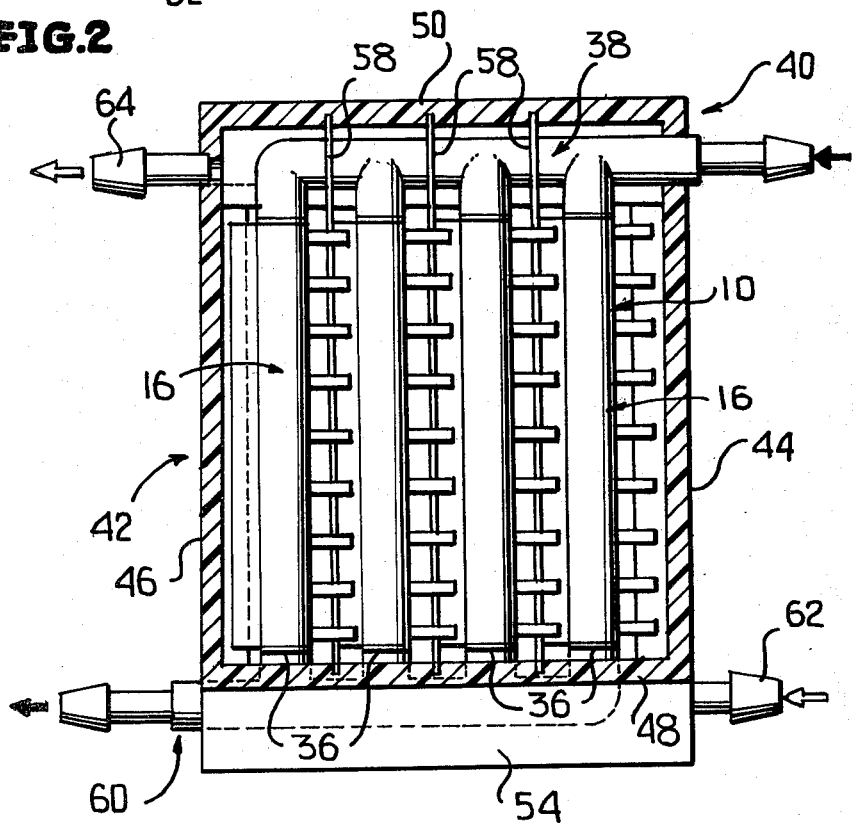

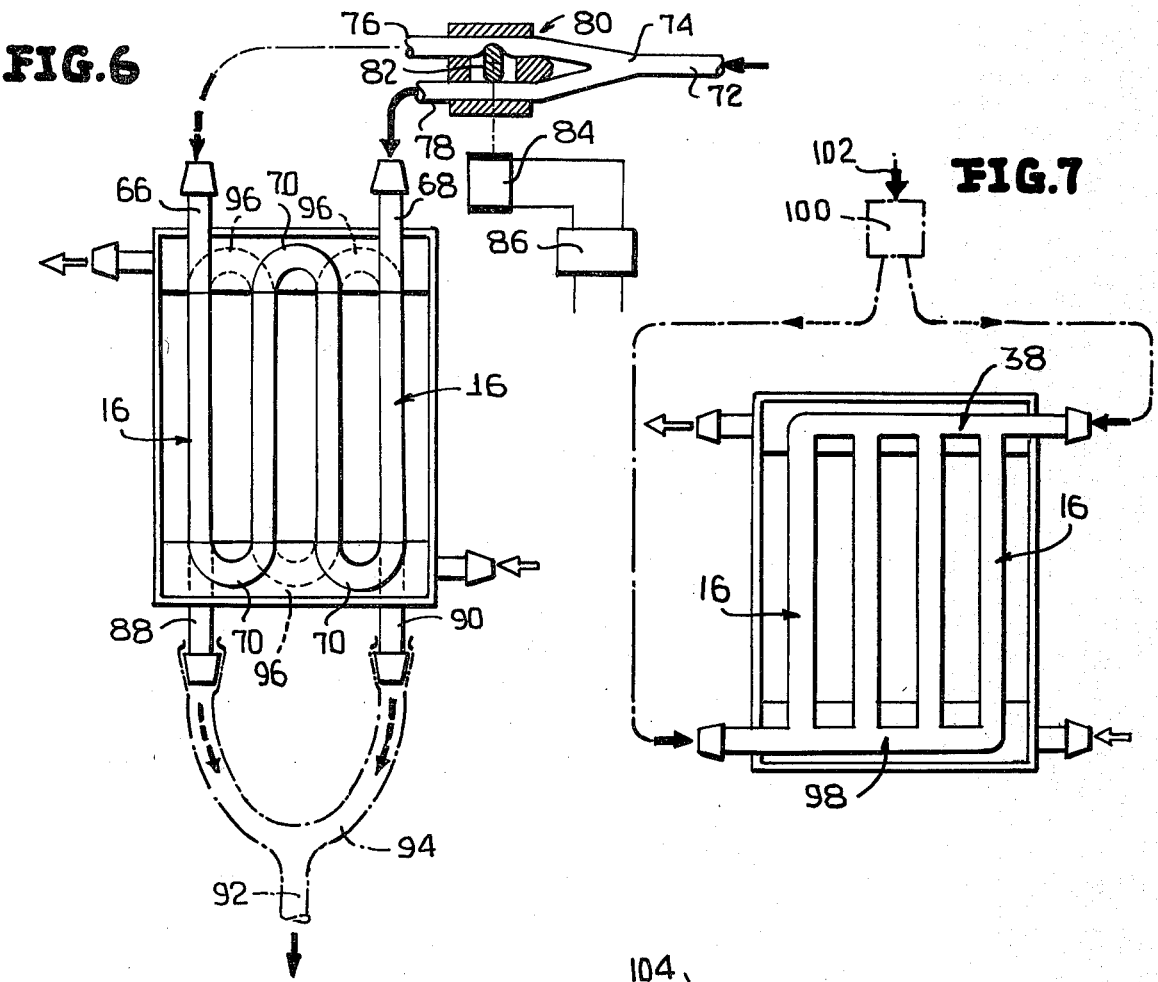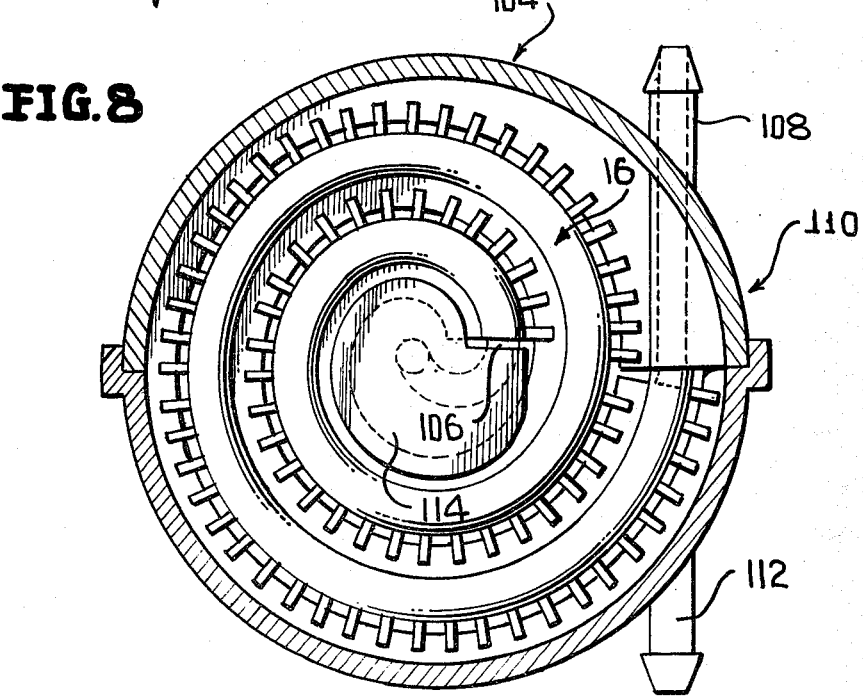

CAPILLARY TUBE EXCHANGE DEVICE

This invention relates in general to new and useful improvements in exchange devices, and more particularly to an exchange device which incorporates capillary tubes through which a fluid, such as blood, to be treated may flow. The exchange device may be, for instance, an artificial kidney.

A principal feature of this invention is the formation of the exchange device in a manner wherein capillary tubes may be bonded together on a continuous basis by means of ribs at the opposite ends thereof. The ribs may be molded in any desired manner with the net result being two elongated ribs having embedded therein in sealed relation opposite ends of a group of capillary tubes all arranged in spaced parallel relation whereby a fluid may be circulated around the tubes. The ends of the tubes open through remote faces of the ribs. This assembly may be readily formed on a mass production basis.

Associated with each of the ribs is a generally U-shaped cross-sectional header which is mechanically interlocked with the respective rib, the cross-section of each header being such that pressure within will not unduly urge separation of the header from the associated rib.

Each header is preferably provided on opposite sides thereof with spacer means adapted to interlock with one another so that an assembly of either a plurality of headers in side-by-side relation or a single pair of headers spirally arranged may be readily interlocked so as to maintain a relationship between adjacent header portions.

The arrangement of the headers is such that the headers may readily have connected thereto suitable manifolds for effecting the flow of a fluid to be treated into the headers and through the tubes. It is to be understood that the headers, tubes and manifolds may be formed of any suitable material which is compatible with human blood and that polyurethane has been found to be suitable material for both the components and the necessary cement for bonding together the various parts.

The arrangement of the headers is such that a plural manifolding may be provided so that fluid flow into and out of the headers may be selectively alternated in direction.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a perspective view of a simplified form of exchange device formed in accordance with this invention.

FIG. 2 is an enlarged horizontal sectional view taken through the upper part of the exchange device of FIG. 1 and shows generally the interior construction thereof.

FIG. 3 is an enlarged fragmentary perspective view with parts broken away and shown in section of an upper part of a tube arrangement including headers therefor.

FIG. 4 is an enlarged transverse end elevational view of a tube arrangement showing a first functional header configuration.

FIG. 5 is a fragmentary end elevational view similar to FIG. 4 and showing a slightly modified header configuration.

FIG. 6 is a sectional view similar to FIG. 2 and shows the headers connected by a modified form of manifolding whereby fluid flow into the headers may be alternately pulsed through the headers in opposite directions.

FIG. 7 is another sectional view similar to FIG. 2 showing still another form of manifolding.

FIG. 8 is a horizontal sectional view taken through the upper part of still another exchange device and shows the internal construction thereof.

In accordance with this invention, there may be provided on a somewhat continuous basis a capillary tube assembly generally identified by the numeral 10. Capillary tubes 12 will normally be provided in transverse rows in continuous spaced relation so that the assembly 10 will include a plurality of capillary tubes 12 arranged basically in rows and columns. The capillary tubes 12, after they are positioned relative to one another in spaced parallel relation, will have their end portions bonded together in externally sealed relation by means of a pair of continuously formed ribs 14. The ribs 14 may be formed in any desired manner including injection molding or continuous casting, and may be formed of either molded plastics material or cast plastics material cement.

After the ribs 14 have been formed, there are interlocked therewith on a continuous basis separately formed headers 16. Each header 16 has a pair of spaced legs 18, 20 and an arcuate intermediate portion 22. The legs 18, 20 have thickened lower portions 24 terminating in tapered shoulders 26 which form a positive mechanical interlock with like tapered shoulders 28 formed on the ribs 14.

At this time reference is made to FIG. 5 where a modified form of header 16' is shown. The header 16' differs from the header 16 only in that it has an arcuate portion 22' of lesser curvature than the arcuate portion 22.

It is to be noted from FIGS. 4 and 5 that the curvature of the arcuate portions 22, 22' such that the maximum spacing of an arcuate portion from an adjacent end surface of a rib 14 is less than one-half of the width of the end face of the rib. Thus, fluid pressures within the headers 16, 16' tend to urge the legs 18, 20 together as opposed to effecting a separation of the legs, and thus there is no stress placed upon the connections between the legs 18, 20 and the ribs 14. It is to be understood, however, that the headers 22, 22' may be bonded to the ribs 14 by means of a suitable cement.

It is also to be noted at this time that the legs 18, 20 are provided with suitable spacer means. The spacer means carried by the leg 18 is in the form of a continuously extending fin 30 whereas the spacer means carried by the leg 20 are in the form of separate fins 32 each having a circular notch 34. The fin 30 extends transversely of the tubes 12 while the fins 32 extend parallel to the tubes and the notches 34 are in alignment to receive the fin 30 of the next adjacent header.

Referring now to FIG. 2 in particular, it will be seen that a continuously formed tube assembly, complete with headers, may be severed into desired lengths and the short tube assembly lengths may be interlocked together. One end of each header may be closed by means of a plug 36 while the other end of each header may have secured thereto a suitable manifold 38. In the arrangement shown in FIGS. 1 and 2 wherein a complete exchange device, generally identified by the numeral 40 is illustrated, there is a housing generally identified by the numeral 42. The housing 42 is generally Z-shaped in outline and includes a pair of side plates 44, 46, generally Z-shaped in outline. The side plates 44, 46 are connected together by further side plates 48, 50 which extend a major portion of the height of the exchange device 40. The side plates 48, 50 are supplemented by additional plates 52, 54 in view of the generally Z-shaped configuration of the housing 42. The housing 42 further includes suitable end plates 56.

Referring once again to FIG. 2, it will be seen that the side plates 48, 50 have embedded therein edges of plates 58. These plates are thin plates and are preferably formed of stainless steel. The plates 58 are telescoped over the fins 32 and serve both to support the tube assembly 10 within the housing 42 and to define flow passages for a treating fluid.

As previously described, the headers 16 at inlet ends of the tube assembly 10 are connected together by an inlet manifold 38. A similar outlet manifold 60 is connected to the headers 16 at the opposite ends of the tube assembly 10, but at the remote ends of the headers 16. It is to be noted that the manifold 38 extends through the side plate sd44 while the manifold 60 extends through the side plate 46 with the manifolds 38 and 60 being disposed in the offset upper and lower parts of the housing 42 as is best shown in FIGS. 1 and 2.

In order that a treating or wash fluid may be circulated through the housing 42 in a direction opposite to the flow of a first fluid through the capillary tubes 12, the housing 42 carries a supply manifold 62 in the lower part thereof and a return manifold 64 in the upper part thereof as is best shown in FIG. 1.

Referring now to FIG. 6, it will be seen that there is illustrated a slightly modified form of manifolding. Instead of the upper headers 16 having closed ends at one end thereof and a plural outlet manifold connected to the opposite ends thereof, the two endmost headers 16 are provided with inlet manifolds 66, 68 and adjacent ends of all of the headers 16 not provided with the manifolds 66, 68 will be interconnected by means of U-bends 70. Thus all of the upper headers 16 are interconnected in serial relation for flow therethrough.

The fluid to be treated is delivered by means of a supply line 72 which has incorporated therein a Y-connection 74 having branches 76, 78 connected to the manifolds 66, 68 respectively. The branches 76, 78 have associated therewith a flow restricting device generally identified by the numeral 80 which includes a flow shut-off device 82 positioned by means of a coil 84. The flow shut-off device 82 in one position closes the branch 76 and in the opposite position closes the branch 78. Energy to the coil 84 is selectively reversed by a pulsating switch 86 so that first the branch 76 is closed and then the branch 78 is closed, thereby reversing flow within the headers 16 so as to prevent accumulation of sludge within the headers.

The lower headers are interconnected in the same manner as described above with respect to the upper headers to include outlet manifolds 88, 90 connected to an outlet line 92 by a Y-fitting 94. Reverse bends 96 connect the lower headers 16 in serial relation.

In FIG. 7 there is schematically illustrated another arrangement for providing pulse reversal of flow through the headers 16. In this arrangement first ends of the upper headers 16 are connected by a manifold 38 in the same manner as that illustrated in FIG. 2. At the same time the normally plugged second ends of the headers 16 are connected together by a second inlet manifold 98. The manifolds 38 and 98 are connected to a pulsating flow diverter 100 for receiving on an alternating basis a fluid to be treated from a fluid supply line 102.

It is to be understood that the ends of the lower headers 16 will be connected together in the usual manner by an outlet header 60 at one end and a similar header at the opposite end so that the lowermost headers will have manifolds connected to the opposite ends thereof permitting outlet flow through the headers first in one direction and then in the opposite direction.

Reference is now made to FIG. 8 wherein still another form of exchange device is illustrated, the exchange device being identified by the numeral 104. The exchange device is formed of one continuous tube assembly 10 which is wound in spiral relation and wherein adjacent header portions 16 are in interlocked relation. If desired, a stainless steel sheet such as the sheet 58 of FIG. 2 may also be spirally wound in conjection with the tube assembly 10 and the headers 16. In the illustrated form of the invention, one end of each manifold 16 is plugged with a plug 106 and the opposite end is provided with a manifold 108. It is to be understood that one manifold 108 is to be an inlet manifold and the other manifold (not shown) will be an outlet manifold. It is also to be understood that suitable manifolds will be coupled to the housing 110 of the exchange device 104 for circulating a treating fluid around the capillary tubes 12. These manifolds will include a supply manifold 112 and a non-illustrated return manifold 114. The supply manifold 112 will be at the bottom of the housing 10, remote from the inlet manifold 108, so that flow of the treating fluid relative to the tubes 12 will be opposite to the flow of the fluid being treated.

Although the inner end of the upper header 16 and the outer end of the lower header 16 will normally be plugged, it is to be understood that the plugged end of the upper header may also be provided with an inlet manifold and that the normally plugged outer end of the lower header may be provided with a second outlet manifold so that the fluid to be treated may be pulsed in the headers in the same manner as described with respect to the embodiments of FIGS. 6 and 7.

At this time it is also pointed out that in order to provide for good circulation of the treating or bath fluid relative to the innermost ones of the tubes 12, the exchange device 104 may include a circular plug 114 as is clearly illustrated in FIG. 8. The plug 114 will extend the full height of the housing 104 and normally will be connected to both ends (not shown) of the housing.

Although there has been illustrated several embodiments of exchange devices utilizing the capillary tube assembly and header combination, it is to be understood that the uses of such combination are not so restricted and the assembly and header combination may be utilized in other exchange device arrangements without departing from the spirit and scope of this invention as defined by the appended claims.

I claim:

1. In an exchange device, a group of tubes arranged generally in spaced parallel relation in at least one row, sealing means bonding opposite end portions of said tubes together with external surfaces of said tube end portions being sealed relative to each other, said sealing means at each end of said tubes being in the form of an elongated rib with ends of said tubes opening through said ribs, and a tubular header sealed to each of said ribs and in combination with an associated rib defining a fluid passage in communication with interiors of said tubes, said headers each being generally U-shaped in cross-section and having spaced legs each sealed with a side surface of a respective rib, and said legs having thickened free end portions terminating centrally of said rib sides in tapered shoulders having a direct mechanical interlock with said rib sides.

2. In the exchange device of claim 1 wherein each header is of an arcuate cross-section between said legs, and the maximum spacing between the respective rib and said arcuate header portion is on the order of one-half the width of said rib whereby transverse forces urging transverse separation of said legs from said rib due to internal pressure within said header are held to a minimum.

3. In the exchange device of claim 1, each header having spacer means extending transversely from its legs exteriorly of said header, and said spacer means being of complementary interlocking relation.

4. In the exchange device of claim 1, inlet and outlet manifolds connected to respective ones of said headers for directing a first fluid through said tubes, a housing surrounding said tubes and said headers, and separate supply and return means for circulating a second fluid around said tubes.

5. In the exchange device of claim 4 wherein said housing is generally Z-shaped in outline to provide clearance for said manifolds at remote corners of said housing.

6. In the exchange device of claim 4 wherein there are a plurality of groups of tubes and a plurality of pairs of headers, and there are two inlet manifolds and two outlet manifolds and means for alternating a first fluid supply to said inlet manifolds, the connections between said inlet manifolds and said headers being means for reversing first fluid flow direction through said headers.

7. In the exchange device of claim 6 wherein each manifold is connected to an end of each header of a respective group of said headers.

8. In the exchange device of claim 6 wherein all headers connected to said inlet manifold are serially connected to one another.

9. In the exchange device of claim 4 wherein said headers and tubes are in spirally arranged relation.

10. In the exchange device of claim 4, supporting and second fluid flow path defining sheets carried by said housing and engaging interlocking ones of said spacer means.

* * * * *